(12) United States Patent
Hasegawa et al.

(10) Patent No.: US 9,079,112 B2
(45) Date of Patent: Jul. 14, 2015

(54) REVERSIBLE SPACER FOR A ROTATABLE PERFORMANCE DEVICE

(75) Inventors: Takahiko Hasegawa, Naritahigashi (JP); Stuart Brown, Pasadena (AU)

(73) Assignee: Flambeau, Inc., Baraboo, WI (US)

( * ) Notice: Subject to any disclaimer, the term of this patent is extended or adjusted under 35 U.S.C. 154(b) by 594 days.

(21) Appl. No.: 13/283,207

(22) Filed: Oct. 27, 2011

(65) Prior Publication Data

US 2013/0109269 A1    May 2, 2013

(51) Int. Cl.
*A63H 1/30* (2006.01)
*F16C 35/073* (2006.01)

(52) U.S. Cl.
CPC ............... *A63H 1/30* (2013.01); *F16C 35/073* (2013.01); *Y10T 29/49716* (2013.01)

(58) Field of Classification Search
USPC ......... 446/250, 247, 248, 249, 251, 252, 253, 446/254
See application file for complete search history.

(56) References Cited

U.S. PATENT DOCUMENTS

| | | | | |
|---|---|---|---|---|
| 4,207,701 A | * | 6/1980 | Kuhn | 446/250 |
| 4,555,235 A | * | 11/1985 | Burroughs | 446/250 |
| 5,100,361 A | * | 3/1992 | Kuhn et al. | 446/250 |
| 5,389,029 A | * | 2/1995 | McAvoy, Jr. | 446/250 |
| 5,813,897 A | * | 9/1998 | Van Dan Elzen et al. | 446/250 |
| 5,813,898 A | * | 9/1998 | Van Dan Elzen et al. | 446/250 |
| 5,951,361 A | * | 9/1999 | Van Dan Elzen et al. | 446/250 |
| 6,004,183 A | * | 12/1999 | Dixon et al. | 446/250 |
| 6,080,035 A | * | 6/2000 | Pekarsky et al. | 446/250 |
| 6,142,850 A | * | 11/2000 | Levy | 446/250 |
| 6,155,903 A | * | 12/2000 | Van Dan Elzen et al. | 446/250 |
| 6,162,109 A | * | 12/2000 | Baier | 446/250 |
| 6,196,890 B1 | | 3/2001 | Amaral | |
| 6,196,891 B1 | | 3/2001 | Jamison | |
| 6,206,749 B1 | * | 3/2001 | Bell | 446/250 |
| 6,213,838 B1 | | 4/2001 | Amaral | |
| 6,220,920 B1 | * | 4/2001 | Baier | 446/250 |
| 6,579,142 B1 | * | 6/2003 | Rehkemper et al. | 446/247 |
| 6,599,165 B1 | | 7/2003 | Van Dan Elzen | |
| 6,887,122 B1 | | 5/2005 | Van Dan Elzen et al. | |
| 6,896,576 B1 | | 5/2005 | VanKuiken | |
| 7,125,310 B1 | | 10/2006 | Van Dan Elzen | |
| 7,192,330 B2 | | 3/2007 | Van Dan Elzen | |
| 7,419,417 B1 | * | 9/2008 | VanKuiken | 446/250 |
| 7,621,796 B2 | | 11/2009 | Schonert et al. | |
| 7,874,890 B2 | | 1/2011 | Van Dan Elzen | |
| 8,075,365 B2 | * | 12/2011 | Schonert et al. | 446/250 |
| 8,328,595 B2 | * | 12/2012 | Van Dan Elzen | 446/250 |
| 8,360,814 B2 | * | 1/2013 | Van Dan Elzen | 446/250 |
| 2004/0198151 A1 | | 10/2004 | Bell | |
| 2005/0287910 A1 | * | 12/2005 | O'Sullivan | 446/250 |
| 2006/0094329 A1 | * | 5/2006 | Van Dan Elzen | 446/250 |
| 2006/0178083 A1 | * | 8/2006 | Van Dan Elzen | 446/250 |
| 2006/0246818 A1 | * | 11/2006 | Van Dan Elzen | 446/250 |
| 2010/0022159 A1 | * | 1/2010 | Schonert et al. | 446/250 |
| 2010/0210174 A1 | | 8/2010 | Weems | |
| 2011/0256793 A1 | * | 10/2011 | Van Dan Elzen | 446/250 |
| 2012/0244780 A1 | * | 9/2012 | Van Dan Elzen et al. | 446/250 |
| 2012/0252312 A1 | * | 10/2012 | Hasegawa | 446/250 |

* cited by examiner

*Primary Examiner* — Melba Bumgarner
*Assistant Examiner* — Joseph B Baldori
(74) *Attorney, Agent, or Firm* — Quarles & Brady LLP

(57) ABSTRACT

A rotatable performance device, such as a yo-yo, is modifiable such that the device can act as a relatively responsive device for beginners and a relatively stable device for advanced users. Spacers that facilitate these modifications and a method for configuring the spacers to change the device's responsiveness and stability are also disclosed.

20 Claims, 6 Drawing Sheets

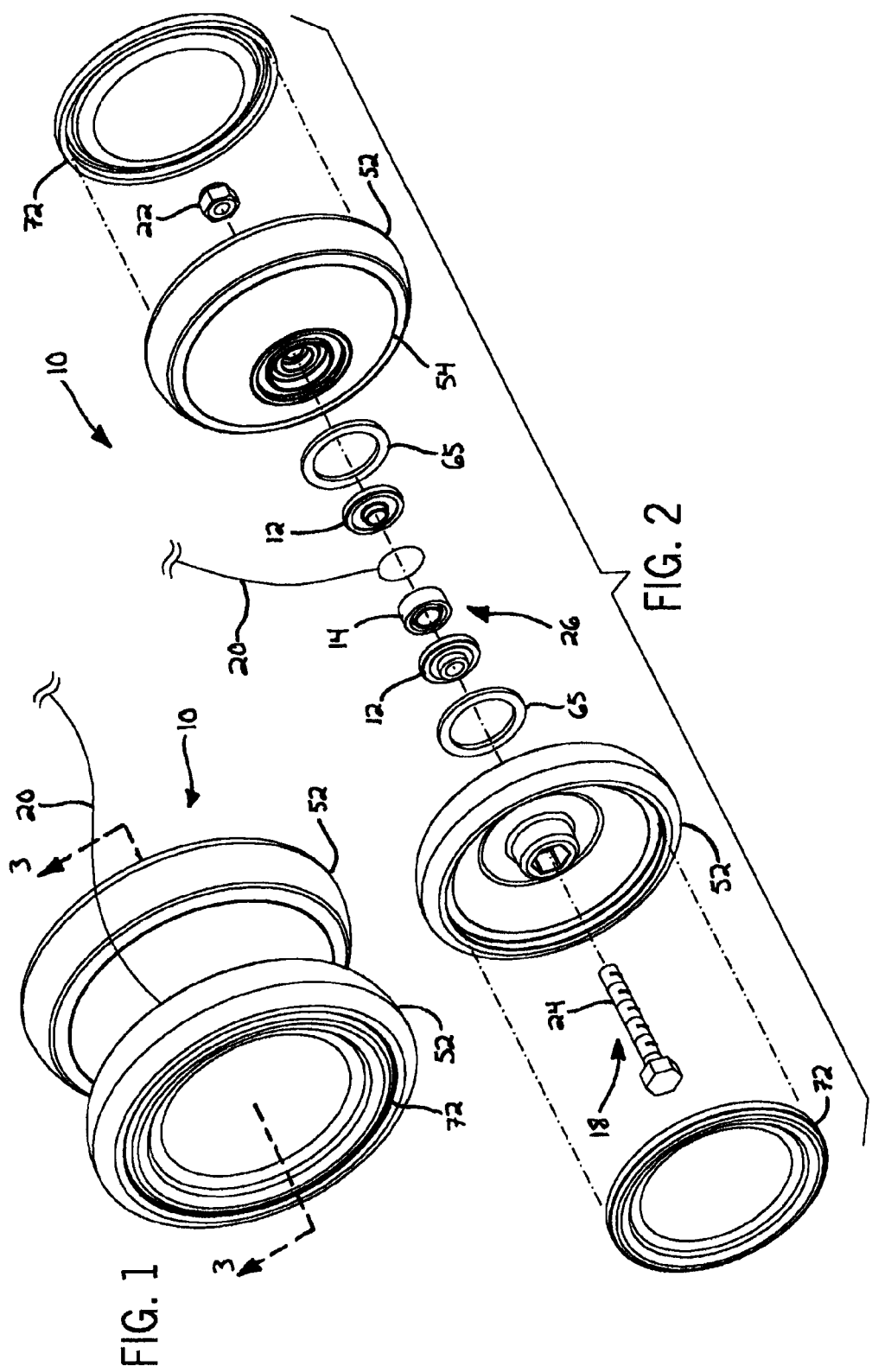

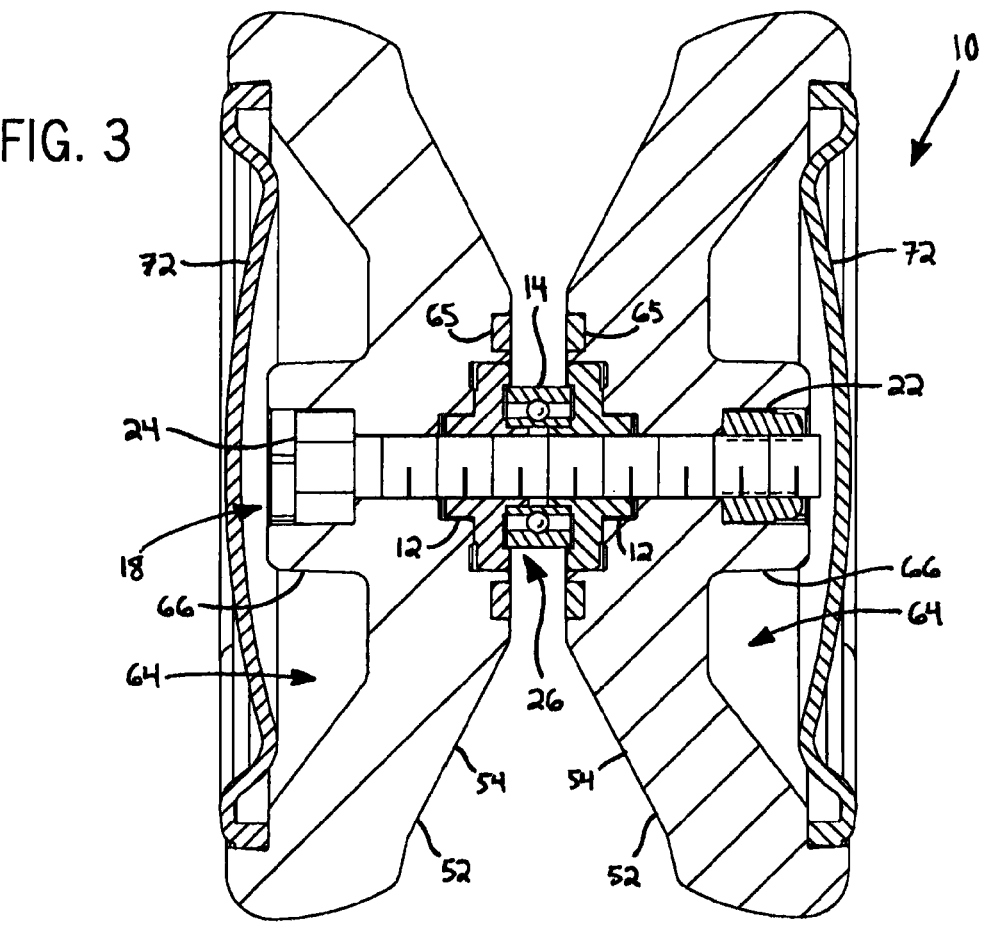
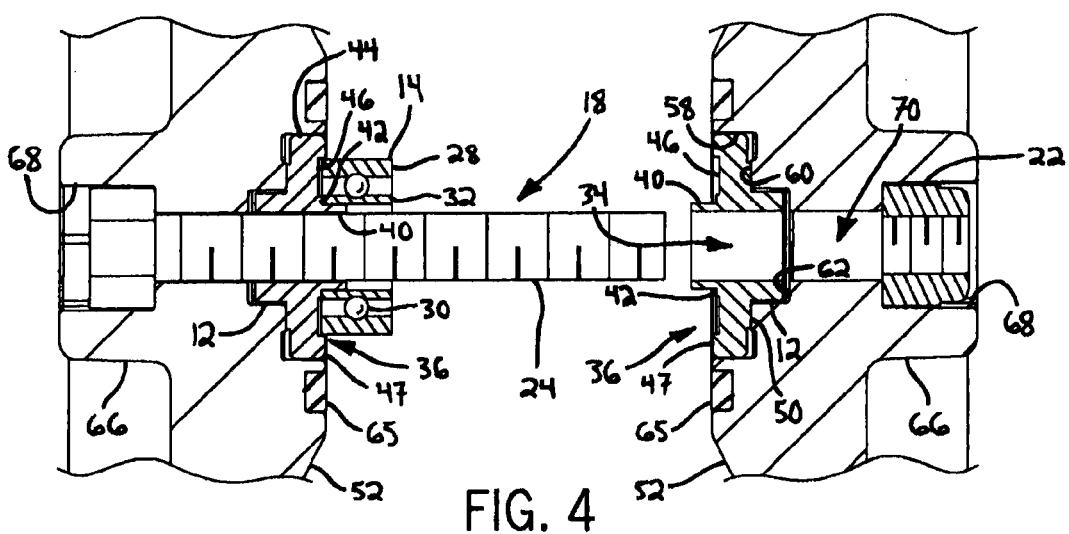

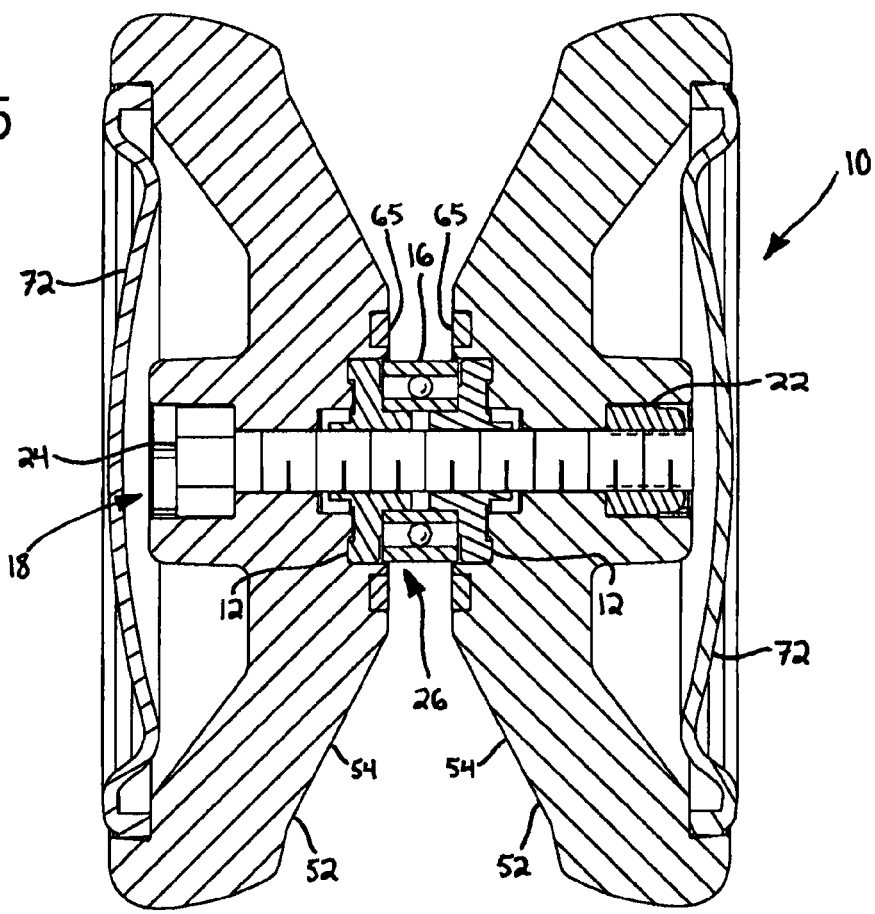
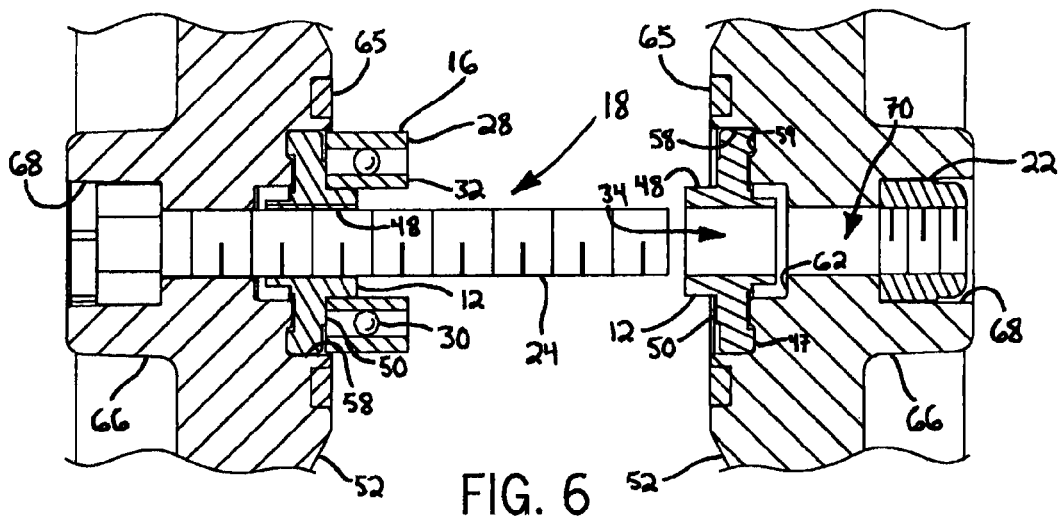

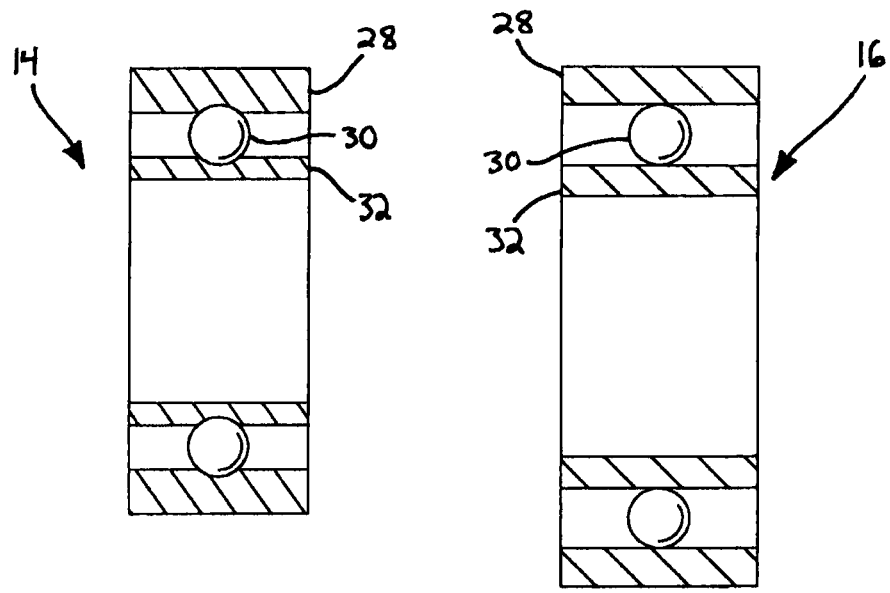
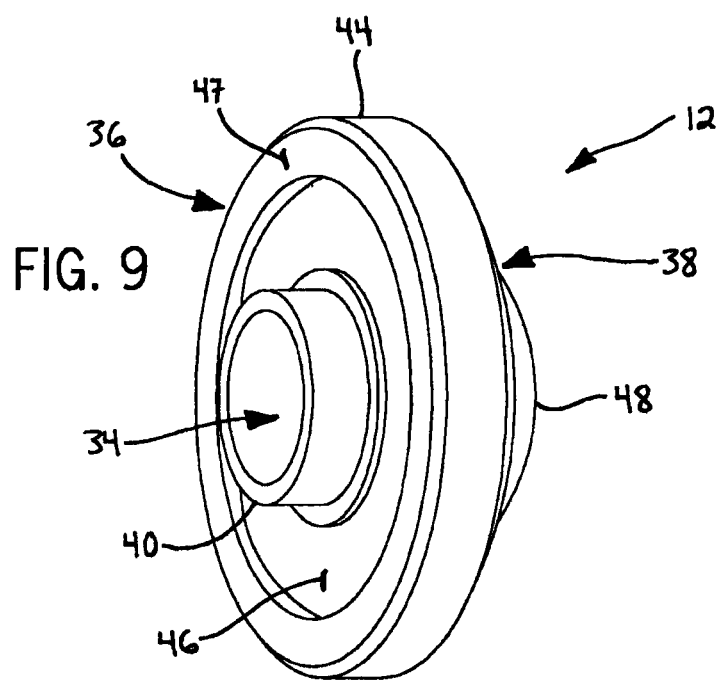

REVERSIBLE SPACER FOR A ROTATABLE PERFORMANCE DEVICE

CROSS-REFERENCE TO RELATED APPLICATION

Not applicable.

STATEMENT CONCERNING FEDERALLY SPONSORED RESEARCH OR DEVELOPMENT

Not applicable.

BACKGROUND OF THE INVENTION

The present invention relates to rotatable performance devices, particularly yo-yos having components that are selectively reversible to support bearings having different sizes.

Rotatable performance devices, such as diabolos, yo-yos, and the like, are well-known devices for performing maneuvers or tricks. Yo-yos typically include a string that engages the outer race of a bearing (e.g., a ball bearing), and the string is initially wound around the bearing and connects to a user's finger. The yo-yo is "thrown down" to cause the inner race of the bearing and two halves or lobes of the yo-yo to spin relative to the string. After the lobes begin spinning or "sleeping" at the end of the string, the user may perform maneuvers such as "walking the dog", swinging the yo-yo "around the world", and the like.

The size of the bearing (e.g., the inner diameter, outer diameter, and width) typically depends on the skill level of the intended user. For example, beginner yo-yos typically include relatively small bearings because such bearings form a small gap between the lobes. A small gap typically provides a relatively responsive yo-yo (i.e., a yo-yo that easily returns from a sleeper and performs other maneuvers), which is generally preferred by beginners. In contrast, advanced yo-yos typically include relatively large bearings that form a large gap between the lobes. A large gap typically provides a relatively stable and less responsive yo-yo. Such yo-yos are preferred for performing complex multiple-bind maneuvers (i.e., maneuvers in which multiple passes of the string engage the bearing).

From the above, it can be appreciated that many beginners eventually replace their original yo-yo with a yo-yo having a relatively large bearing to perform complex maneuvers. To spare users the expense of purchasing another yo-yo, it would be beneficial to have a yo-yo design that is appropriate for both beginners and advanced yo-yo users.

SUMMARY OF THE INVENTION

The present invention provides a rotatable performance device, such as a yo-yo, with modifiable stability and response characteristics such that the device is appropriate for both beginners and advanced yo-yo users. The present invention also provides spacers that facilitate these modifications and a method for configuring the spacers to change the device's responsiveness and stability.

In one aspect, the present invention provides a spacer for supporting bearing members of different sizes in a rotatable performance device supported by a tether. The rotatable performance device includes an axle, a first bearing member having a first nominal size, and a first outer lobe and a second outer lobe each supported by the axle. The spacer comprises a first side that includes a first bearing member hub configured to clearance-fittingly support the first bearing member. The spacer further comprises a second side opposite the first side that includes a second bearing member hub configured to clearance-fittingly support a second bearing member having a second nominal size greater than the first nominal size if the first bearing member is detached from the rotatable performance device.

In another aspect, the present invention provides a rotatable performance device for performing maneuvers as at least a portion of the device rotates relative to a tether engaging the device. The device comprises an axle and a first bearing member detachably supported by the axle and having a first nominal size. The device further comprises two assemblies supported on opposite ends of the axle. Each assembly includes a spacer detachably supported by the axle. The spacer includes a first side having a first bearing member hub configured to clearance-fittingly support the first bearing member. A second side opposite the first side includes a second bearing member hub configured to clearance-fittingly support a second bearing member having a second nominal size greater than the first nominal size if the first bearing member is detached from the rotatable performance device. Each assembly further includes an outer lobe supported by the axle proximate the spacer and opposite the first bearing member. The outer lobe has an outer lobe recess sized to receive the spacer.

In another aspect, the present invention provides a method of modifying a rotatable performance device capable of performing maneuvers as at least a portion of the device rotates relative to a tether engaging the device. The rotatable performance device includes an axle, a spacer supported by the axle, a first bearing member supported by the spacer and having a first nominal size, a first outer lobe supported by the axle, and a second outer lobe supported by the axle opposite the first outer lobe. The method comprises the steps of detaching at least one of the first outer lobe and the second outer lobe from the axle. A first of the spacers is detached from the axle, the first bearing member is detached from the axle and a second of the spacers, and the second spacer is detached from the axle. The orientation of the spacers relative to the axle is then inverted. The second spacer is attached to the axle, a second bearing member having a second nominal size different than the first nominal size is attached to the second spacer, and the first spacer is attached to the axle and the second bearing member. The at least one of the first outer lobe and the second outer lobe is attached to the axle.

In yet another aspect, the present invention provides a kit for modifying a rotatable performance device for performing maneuvers as at least a portion of the device rotates relative to a tether engaging the device. The rotatable performance device includes an axle, a first outer lobe supported by the axle, and a second outer lobe supported by the axle apart from the first outer lobe. The kit comprises a first bearing member having a first nominal size, a second bearing member having a second nominal size different than the first nominal size, and two spacers configured to be detachably supported by the axle between the first and second outer lobes. Each spacer includes a first side having a first bearing member hub configured to clearance-fittingly support the first bearing member if the second bearing member is detached from the rotatable performance device. Each spacer further includes a second side opposite the first side that has a second bearing member hub configured to clearance-fittingly support the second bearing member if the first bearing member is detached from the rotatable performance device.

The foregoing and advantages of the invention will appear in the detailed description which follows. In the description, reference is made to the accompanying drawings which illustrate a preferred embodiment of the invention.

BRIEF DESCRIPTION OF THE DRAWINGS

The invention will hereafter be described with reference to the accompanying drawings, wherein like reference numerals denote like elements, and:

FIG. 1 is a perspective view of a rotatable performance device including reversible spacers according to the present invention;

FIG. 2 is an exploded perspective view of the rotatable performance device of FIG. 1;

FIG. 3 is a section view of the rotatable performance device along line 3-3 of FIG. 1 and including a small bearing member;

FIG. 4 is a partially exploded detail view of the rotatable performance device of FIG. 3;

FIG. 5 is a section view of the rotatable performance device like FIG. 3 but including a large bearing member;

FIG. 6 is a partially exploded detail view of the rotatable performance device of FIG. 5;

FIG. 7 is a section view of the small bearing member along line 3-3 of FIG. 1;

FIG. 8 is a section view like FIG. 7 but of the large bearing member;

FIG. 9 is a perspective view of a reversible spacer of the rotatable performance device of FIG. 1;

DETAILED DESCRIPTION OF THE INVENTION

Figure 10:
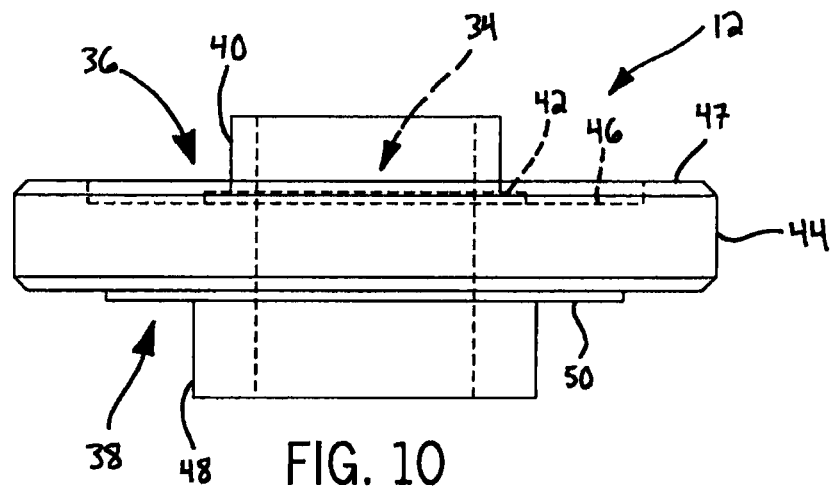
FIG. 10 is a side view of the reversible spacer of FIG. 9.

The particulars shown herein are by way of example and only for purposes of illustrative discussion of the embodiments of the invention. The particulars shown herein are presented to provide what is believed to be the most useful and readily understood description of the principles and conceptual aspects of the invention. In this regard, no attempt is made to show structural details of the invention in more detail than is necessary for the fundamental understanding of the invention. The description taken with the drawings should make apparent to those skilled in the art how the several forms of the present invention may be embodied in practice.

Referring generally to FIGS. 1-3, the invention provides both a rotatable performance device, such as a yo-yo 10, with modifiable stability and response characteristics and reversible spacers 12 (FIGS. 9-11) that facilitate such modifications. In particular, the spacers 12 may be oriented to support either a relatively small bearing member 14 (FIGS. 3 and 4) or a relatively large bearing member 16 (FIGS. 5 and 6). As such, the yo-yo 10 can act as a relatively responsive device for beginners and a relatively stable device for advanced users. These aspects, in addition to details of the above components, are further described below.

Still referring to FIGS. 1-3, the yo-yo 10 includes an axle 18 that supports the above components and provides an axis about which some components of the yo-yo 10 rotate relative to a support string or tether 20. In the embodiments shown in the figures, the axle 18 includes a nut 22 that detachably engages a threaded bolt 24.

Turning now to FIGS. 3-6, the axle 18 supports a bearing assembly 26 along the shaft of the bolt 24. The bearing assembly 26 interchangeably includes either the small bearing member 14 (FIGS. 3 and 4) or the large bearing member 16 (FIGS. 5 and 6). Each of the dimensions of the small bearing member 14 (e.g., the inner diameter, outer diameter, and width) are generally less than those of the large bearing member 16. Stated another way, the small bearing member 14 has a smaller "nominal" size than the larger bearing member 16.

Regardless of their specific dimensions, each of the bearing members 14, 16 permits relative rotation between some components of the yo-yo 10 and the tether 20. To this end, each of the bearing members 14, 16 may be any appropriate type of bearing, such as a ball bearing. Such bearing members 14, 16 each include a generally annular outer race 28 (FIGS. 7 and 8) that connects to the tether 20. Rolling elements 30, such as ball elements, separate the outer race 28 from a generally annular inner race 32. As a result, during use the outer race 28 remains stationary relative to the tether 20 while the inner race 32 rotates, together with the remaining components of the yo-yo 10, relative to the tether 20.

Referring now to FIGS. 3-6 and 9-11, the bearing assembly 26 further includes the reversible spacers 12 briefly described above. The spacers 12 are supported by the axle 18 on opposite axial sides of the bearing member 14 or 16 mounted to the yo-yo. The two spacers 12 are generally identical, and the yo-yo 10 is generally symmetrical over a vertical plane bisecting the bearing member 14 or 16. As such, only one axial side of the yo-yo 10 will be described for the remainder of the description.

Figure 11:
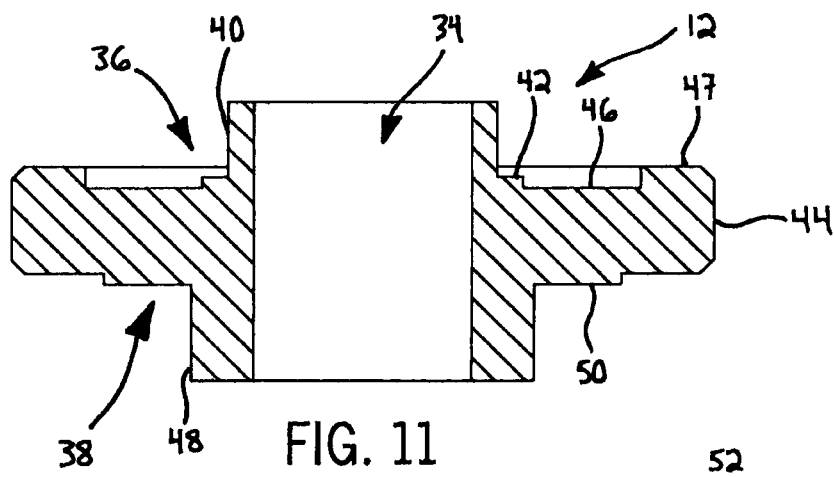
FIG. 11 is a section view of the reversible spacer along line 3-3 of FIG. 1.

Turning particularly to FIGS. 9-11, the reversible spacer 12 may be a component formed using well-known materials and methods (e.g., molded metals, thermoplastics, or the like). In general, the spacer 12 has a disk-like shape with an inner passageway 34 through which the axle 18 extends. The spacer 12 also has a first side 36 and a second side 38 which engage and support the small bearing member 14 and the large bearing member 16, respectively.

The first side 36 of the spacer 12, which is shown mounting the small bearing member 14 in FIGS. 3 and 4, includes a small bearing member support hub 40 having an annular shape. The support hub 40 extends into and is sized to clearance-fittingly support the inner race 32 of the small bearing member 14. As used herein, the term "clearance fit" and variations thereof means that a first component can be axially inserted into and removed from a recess of a second component, but the first component cannot generally be moved in a transverse direction perpendicular to the axial direction when disposed in the recess. Stated another way, the outer diameter of the support hub 40 and the inner diameter of the inner race 32 are equal to each other within a clearance fitting range. The phrase "equal within a clearance fitting range" and variations thereof means that dimensions of two components are sufficiently similar to permit one of the components to be clearance-fittingly received in the other component. In the present case, the clearance fit connection between the support hub 40 and the inner race 32 firmly connects the two components and inhibits the small bearing member 14 from shifting transversely on the support hub 40 as the yo-yo 10 rotates.

Adjacent the support hub 40, the first side 36 of the spacer 12 further includes a small bearing member support shoulder 42. The support shoulder 42 abuts the side of the inner race 32 of the small bearing member 14 and inhibits an adjacent spacer body 44 from contacting the outer race 28 of the bearing member 14. As such, the support shoulder 42 has an annular shape that is slightly larger in diameter but shorter in height than the support hub 40.

The support shoulder 42 is disposed in an annular recess 46 defined by the body 44. The surfaces of the recess 46 are spaced apart from the small bearing member 14, which permits the outer race 28 to rotate freely relative to the inner race 32. Furthermore and as illustrated in FIG. 4, an outer surface 47 adjacent the recess 46 maintains the tether 20 near the middle of the outer race 28 during use of the yo-yo 10.

The second side 38 of the spacer 12, which is shown mounting the large bearing member 16 in FIGS. 5 and 6, has many similarities to the first side 36. In particular, the second side 38 includes a large bearing member support hub 48 having an annular shape. However, the large bearing member support hub 48 has a larger outer diameter than the small bearing member support hub 40 and extends into and is sized to clearance-fittingly support the inner race 32 of the large bearing member 16. The second side 38 also includes a large bearing member support shoulder 50. The support shoulder 50 abuts the side of the inner race 32 of the large bearing member 16 and inhibits the spacer body 44 from contacting the outer race 28 to permit free relative rotation. As such, the support shoulder 50 has an annular shape that is slightly larger in diameter but shorter in height than the support hub 48.

Figure 12:
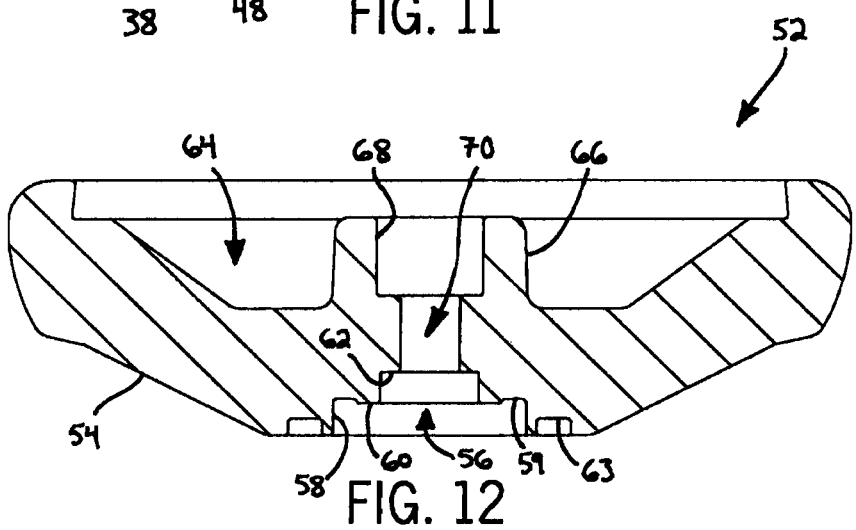
FIG. 12 is a section view of an outer lobe of the rotatable performance device along line 3-3 of FIG. 1.

Referring now to FIGS. 2, 3, and 12, the axle 18 and the bearing assembly 26 engage an outer lobe 52. The outer lobe 52 may be a component formed using well-known materials and methods (e.g., machined aluminum, a molded thermoplastic, or the like). In any case, the outer lobe 52 is preferably symmetrical about the axle 18. In addition, the outer lobe 52 includes a wall having an angled surface 54 that provides the outer lobe 52 with a general bowl shape. The angled surface 54 ensures the tether 20 remains disposed between the outer lobes 52 in use and inhibits the tether from engaging and winding around the outer lobe 52.

Adjacent the angled surface 54, the outer lobe 52 includes an outer lobe recess 56 (FIG. 12) that is configured to receive the reversible spacer 12 in either of the orientations for mounting the bearing members 14 and 16. The outer lobe recess 56 includes a cylindrically-shaped side surface 58 with a diameter sized to clearance-fittingly receive the spacer body 44 in either orientation. Adjacent the side surface 58, the outer lobe recess 56 also includes a recessed surface 59 that abuts the outer surface 47 of the spacer 12 when the spacer 12 supports the large bearing member 16 (FIGS. 5 and 6). Radially inwardly from the recessed surface 59, the outer lobe recess 56 includes an elevated surface 60 that abuts the support shoulder 50 of the spacer 12 when the spacer 12 supports the small bearing member 14 (FIGS. 3 and 4). Together the recessed surface 59 and the elevated surface 60 inhibit the hubs 40 and 48 from contacting a bottom surface 62 of the outer lobe recess 56.

Adjacent the outer lobe recess 56, the outer lobe 52 includes an annular recess 63 that houses a response or braking mechanism, such as a high-friction annular pad 65. Regardless of the specific type that is used, the response mechanism is engageable with the tether 20 to cause the tether 20 to wind around the bearing member 14 or 16 (e.g., to return the yo-yo 10 from a sleeper).

Opposite the outer lobe recess 56, the wall of the outer lobe 52 defines a rear recess 64 that faces away from the tether 20. A generally cylindrical projection 66 extends into the rear recess 64 and receives the head of the bolt 24 in a bolt recess 68 (e.g., a hexagonal-shaped recess). The other outer lobe 52 receives the nut 22 in a nut recess 68 (e.g., a hexagonal-shaped recess). An axle passageway 70 connects the bolt recess 68 and the outer lobe recess 56. As the name implies, the axle passageway 70 is sized to receive the shaft of the bolt 24.

The outer lobe 52 may receive a generally disk-shaped lobe cover 72 in the rear recess 64. The lobe cover 72 may include a picture, symbol, character, or the like that increases the aesthetic appeal of the yo-yo 10, or the lobe cover 72 may simply conceal the axle 18.

Steps for reorienting the spacers 12 and interchanging the bearing members 14 and 16 are generally as follows. Beginning with the yo-yo 10 in the configuration shown in FIGS. 3 and 4, the lobe cover 72 is removed from one of the outer lobes 52. The other outer lobe 52 is then held and the first outer lobe 52 is rotated to detach the lobes 52 and disconnect the nut 22 from the bolt 24. Next, the spacers 12 and one of the bearing members 14 or 16 (e.g., the small bearing member 14) are detached from the bolt 24. The orientation of the spacers 12 is then reversed such that the sides 36, 38 face the opposite direction (e.g., the spacers 12 are pivoted so that the first sides 36 face away from each other instead of toward each other). Next, the spacers 12 are positioned on opposite sides of the other bearing member 14 or 16 and all three components are attached to the bolt 24 (e.g., the large bearing member 16 attaches to the bolt 24 between the second sides 38 of the spacers 12). Finally, the other outer lobe 52 is rotated to attach the outer lobes 52 and connect the nut 22 to the bolt 24, and the lobe cover 72 is attached to the outer lobe 52.

The components of the yo-yo 10 may alternatively take other forms not explicitly described above. For example, the reversible spacers 12 need not include the annular recess 46 depending on the size of the small bearing member 14. As another example, the outer lobes 52 may have different shapes and may include other types of response mechanisms.

Figure 13:
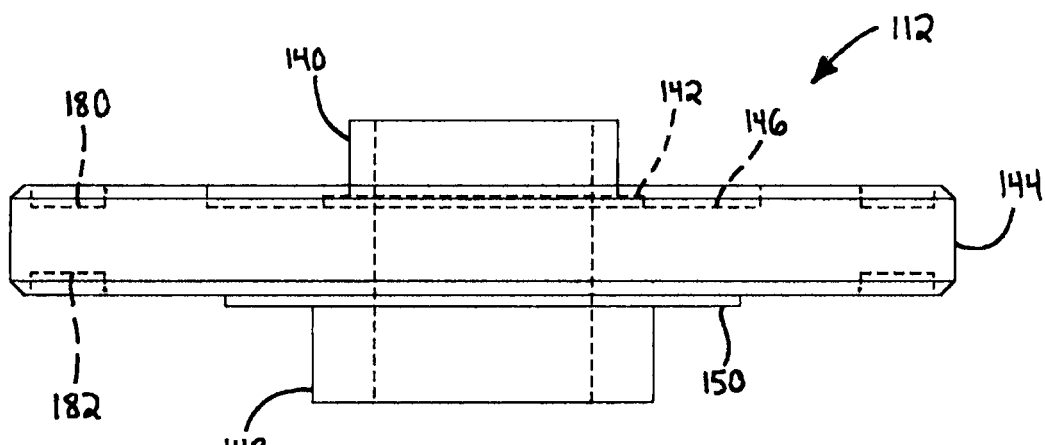
FIG. 13 is a side view of a second embodiment of the reversible spacer.
Figure 14:
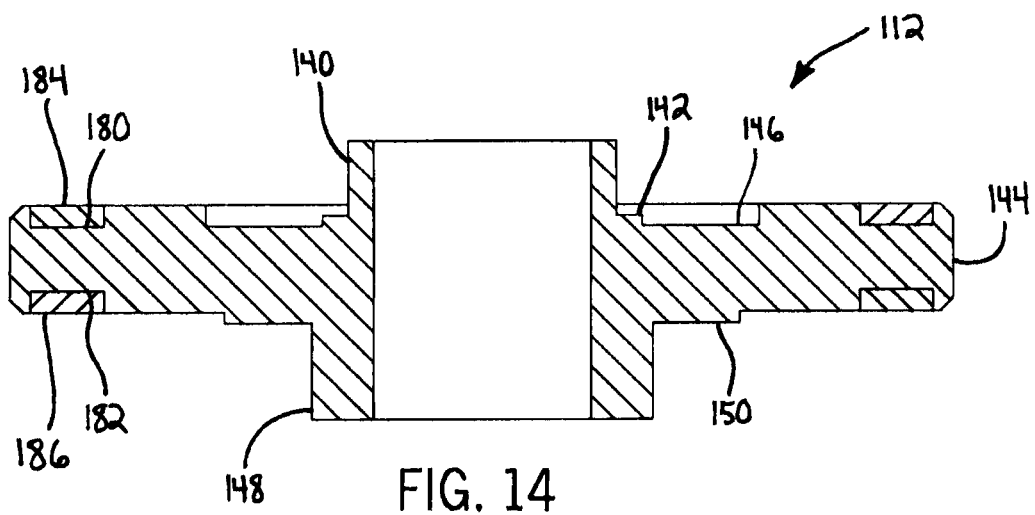
FIG. 14 is a section view of the reversible spacer of FIG. 13.

Turning to FIGS. 13 and 14, a second embodiment of the reversible spacers 112 is shown. Each spacer 112 is generally as described above; that is, each spacer 112 includes a small bearing member support hub 140, a small bearing member support shoulder 142, and an annular recess 146 on a first side and a large bearing member support hub 148 and a large bearing member support shoulder 150 on a second side. However, the body 144 of each spacer 112 generally has a larger diameter than the embodiments described above. Each side of the body 144 also includes an annular recess 180, 182 housing a response mechanism 184, 186 (e.g., a high-friction annular pad or the like). As described above, such response mechanisms engage the tether 20 to cause the tether 20 to wind around the bearing member 14 or 16. In these embodiments, the outer lobes 52 include a larger recess 56 and do not support response mechanisms.

From the above disclosure, it should be apparent that the present invention advantageously provides a rotatable performance device with modifiable stability and response characteristics. As such, the device can act as both a relatively responsive device for beginners and a relatively stable device for advanced users. The invention also provides spacers that facilitate these modifications and a method for configuring the spacers to change the device's responsiveness and stability.

A preferred embodiment of the invention has been described in considerable detail. Many modifications and variations to the preferred embodiment described will be apparent to a person of ordinary skill in the art. Therefore, the invention should not be limited to the embodiment described.

We claim:

1. A rotatable performance device for performing maneuvers as at least a portion of the device rotates relative to a tether engaging the device, comprising:

an axle;
a first bearing member detachably supported by the axle and having a first nominal size;
a second bearing member detachably supported by the axle and having a second nominal size greater than the first nominal size; and
two assemblies supported on opposite ends of the axle, each assembly including:
a spacer detachably supported by the axle and including a first side including a first bearing member hub configured to clearance-fittingly support the first bearing member,
a second side opposite the first side and including a second bearing member hub defining a second hub diameter that is different from a first hub diameter and configured to clearance-fittingly support the second bearing member having the second nominal size greater than the first nominal size, and
an outer lobe supported by the axle proximate the spacer and opposite the first bearing member, the outer lobe having an outer lobe recess sized to receive the spacer.

2. The rotatable performance device of claim 1, wherein the spacer includes a passageway extending through the first bearing member hub and the second bearing member hub and through which the axle extends.

3. The rotatable performance device of claim 1, wherein the first bearing member hub and the second bearing member hub are generally annular.

4. The rotatable performance device of claim 1, wherein the spacer includes a body connecting the first bearing member hub and the second bearing member hub, and wherein the body is clearance-fittingly received in the outer lobe recess.

5. The rotatable performance device of claim 1, wherein the first bearing member includes an inner race and an outer race rotatably supported by the inner race, and the inner race contacts the spacer and the outer race is spaced apart from the spacer and thereby permitted to rotate.

6. The rotatable performance device of claim 5, wherein the first bearing member hub extends into the inner race.

7. The rotatable performance device of claim 1, wherein the first side and the second side of the spacer each support a response mechanism configured to engage the tether.

8. The rotatable performance device of claim 1, wherein the outer lobe supports a response mechanism configured to engage the tether.

9. The rotatable performance device of claim 1, wherein the second bearing member includes an inner race and an outer race rotatably supported by the inner race, and the inner race contacts the spacer and the outer race is spaced apart from the spacer and thereby permitted to rotate.

10. The rotatable performance device of claim 1, wherein the second bearing member defines a width in a direction along the axis that is greater than a width of the first bearing member.

11. The rotatable performance device of claim 1, wherein the second bearing member defines a diameter that is larger than a diameter of the first bearing member.

12. A method of modifying a rotatable performance device capable of performing maneuvers as at least a portion of the device rotates relative to a tether engaging the device, the rotatable performance device including
an axle,
a first bearing member detachably supported by the axle and having a first nominal size,
a second bearing member detachably supported by the axle and having a second nominal size greater than the first nominal size, and
two assemblies supported on opposite ends of the axle, each assembly including: a spacer detachably supported by the axle and including a first side including a first bearing member hub configured to clearance-fittingly support the first bearing member, a second side opposite the first side and including a second bearing member hub defining a second hub diameter that is different from a first hub diameter and configured to clearance-fittingly support the second bearing member having the second nominal size greater than the first nominal size, and an outer lobe supported by the axle proximate the spacer and opposite the first bearing member, the outer lobe having an outer lobe recess sized to receive the spacer, the method comprising the steps of:
detaching at least one of the outer lobes from the axle;
detaching a first of the spacers from the axle;
detaching the first bearing member from the axle and a second of the spacers;
detaching the second spacer from the axle;
inverting an orientation of the spacers relative to the axle;
attaching the second spacer to the axle;
attaching a second bearing member to the second spacer;
attaching the first spacer to the axle and the second bearing member; and
attaching the at least one of the outer lobes to the axle.

13. The method of claim 12, wherein the step of detaching the first bearing member from the second spacer includes detaching the first bearing member from the first bearing member hub.

14. The method of claim 13, wherein the step of attaching the second bearing member to the second spacer includes attaching the second bearing member to the second bearing member hub.

15. The method of claim 13, wherein the step of attaching the second spacer to the axle includes positioning the first bearing member hub within the recess of a first outer lobe.

16. The method of claim 12, wherein the step of detaching a second spacer from the axle includes removing the spacer from the recess of a first outer lobe configured to clearance-fittingly receive the second spacer.

17. The method of claim 16, wherein the step of attaching the second spacer to the axle includes positioning the second spacer in the recess of the first outer lobe.

18. A kit for modifying a rotatable performance device for performing maneuvers as at least a portion of the device rotates relative to a tether engaging the device, the rotatable performance device including an axle, a first outer lobe supported by the axle and having a first outer lobe recess, and a second outer lobe supported by the axle apart from the first outer lobe and having a second outer lobe recess, the kit comprising:
a first bearing member configured to be detachably supported by the axle and having a first nominal size;
a second bearing member configured to be detachably supported by the axle and having a second nominal size greater than the first nominal size; and
two spacers configured to be detachably supported by the axle between the first and second outer lobes, each spacer including:
a first side including a first bearing member hub defining a first hub diameter and configured to clearance-fittingly support the first bearing member, and
a second side opposite the first side and including a second bearing member hub defining a second hub diameter that is different from the first hub diameter and configured to clearance-fittingly support the second bearing member having the second nominal size greater than the first nominal size.

19. The kit of claim 18, wherein the first bearing member hub is configured to extend into an inner race of the first bearing member.

20. The kit of claim 18, wherein the second bearing member hub is configured to extend into an inner race of the second bearing member.

* * * * *